(12) United States Patent
Nakane

(10) Patent No.: US 9,086,827 B2
(45) Date of Patent: Jul. 21, 2015

(54) JOB PROCESSING APPARATUS, JOB PROCESSING METHOD FOR JOB PROCESSING APPARATUS, AND STORAGE MEDIUM

(71) Applicant: Canon Kabushiki Kaisha, Tokyo (JP)

(72) Inventor: Hiroyuki Nakane, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 14/087,982

(22) Filed: Nov. 22, 2013

(65) Prior Publication Data

US 2014/0146361 A1    May 29, 2014

(30) Foreign Application Priority Data

Nov. 27, 2012   (JP) ................................. 2012-258999

(51) Int. Cl.
*G06F 3/12*    (2006.01)
*G06K 15/00*   (2006.01)

(52) U.S. Cl.
CPC ............ *G06F 3/1207* (2013.01); *G06F 3/1212* (2013.01); *G06F 3/1238* (2013.01); *G06F 3/1263* (2013.01); *G06F 3/1285* (2013.01); *G06K 15/002* (2013.01); *G06F 3/1222* (2013.01); *G06F 3/1267* (2013.01)

(58) Field of Classification Search
CPC ... G06F 3/1207; G06F 3/1212; G06F 3/1222; G06F 3/1238; G06F 3/1263; G06F 3/1267; G06F 3/1285; G06K 15/002
USPC ........................................................ 358/1.15
See application file for complete search history.

(56) References Cited

U.S. PATENT DOCUMENTS

| | | | |
|---|---|---|---|
| 2002/0118387 A1* | 8/2002 | Patton ........................... | 358/1.15 |
| 2006/0056666 A1* | 3/2006 | Mizutani et al. .............. | 382/118 |
| 2007/0177185 A1* | 8/2007 | Ogura et al. .................. | 358/1.14 |
| 2010/0073720 A1* | 3/2010 | Wakui et al. .................. | 358/1.15 |
| 2013/0222827 A1* | 8/2013 | Watanabe ..................... | 358/1.13 |
| 2015/0055168 A1* | 2/2015 | Kato ............................. | 358/1.15 |

FOREIGN PATENT DOCUMENTS

JP    2011-037019 A    2/2011

* cited by examiner

*Primary Examiner* — Fred Guillermety
(74) *Attorney, Agent, or Firm* — Canon U.S.A., Inc. IP Division

(57) ABSTRACT

A job processing order for reducing waiting time of individual users is displayed in a case where a plurality of users requesting jobs is recognized at the same time. A control method for controlling a job processing apparatus includes holding jobs in a holding unit, imaging a plurality of users, detecting face information of the plurality of imaged users, recognizing the plurality of users based on the detected face information, searching the holding unit for jobs of the plurality of recognized users, determining, based on processing time of the searched jobs, an order of executing the searched jobs, and displaying information indicating the users corresponding to the ordered jobs, based on the determined order of executing the jobs.

9 Claims, 14 Drawing Sheets

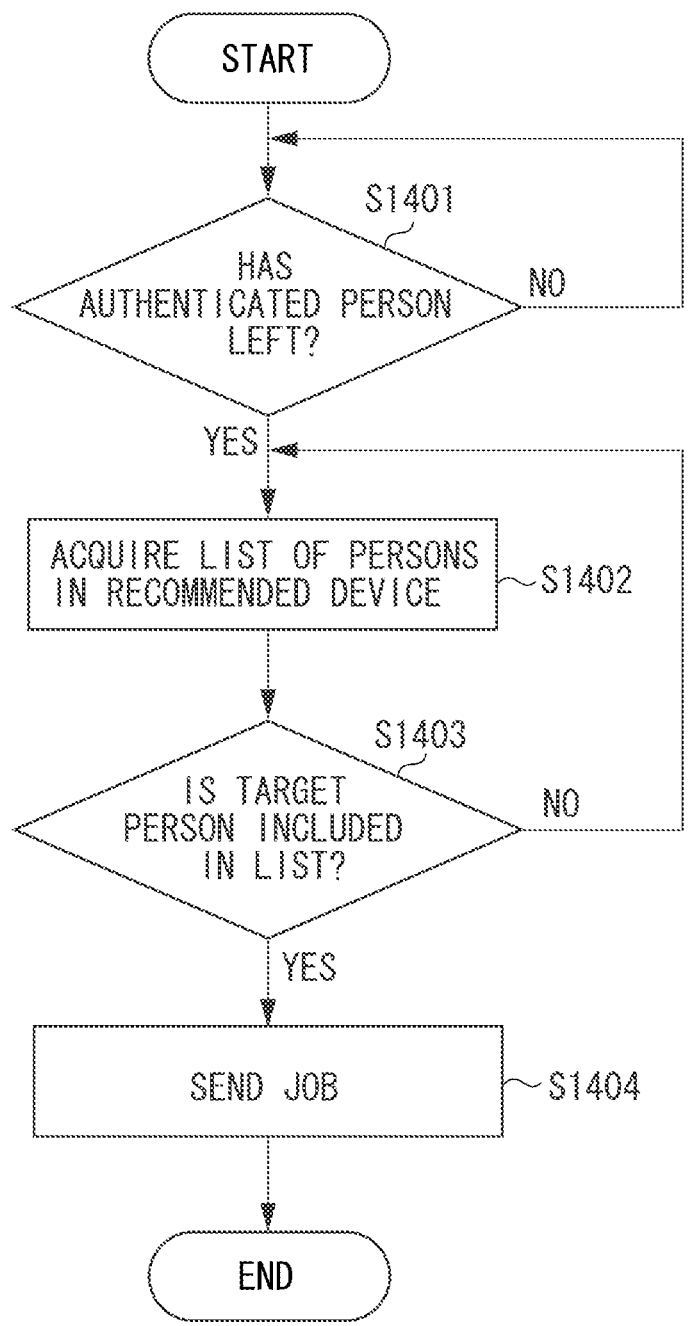

JOB PROCESSING APPARATUS, JOB PROCESSING METHOD FOR JOB PROCESSING APPARATUS, AND STORAGE MEDIUM

BACKGROUND OF THE INVENTION

1. Field of the Invention

The present invention relates a job processing apparatus for recognizing users and performing job processing, a job processing method for the job processing apparatus, and a storage medium.

2. Description of the Related Art

As a camera device achieves high definition and personal authentication techniques of camera improves, information apparatuses having a personal authentication system equipped with a camera device is appearing one after another. Especially, some multifunction peripherals (MFPs) having a camera device are provided with a function of authenticating persons around the MFP apparatus.

In recent years, forms of performing print processing from information terminals such as personal computers (PCs) to the MFPs have been varied, and jobs of users of the MFPs have been varied too. Not only a MFP is specified from an information terminal to perform printing, but also, for example, a print job may be once spooled in a hard disk drive (HDD) in a MFP and then printing is performed, or a print job is spooled in a server in the same network and printing of the job is performed by an arbitrary MFP.

By using the above-described techniques, persons around a MFP can be detected and the jobs of the individual persons are subjected to analogizing and analyzed. Thus, control suitable for the jobs is performed in advance to reduce the time to complete the printing (see Japanese Patent Application Laid-Open No. 2011-037019).

The conventional technique is, however, directed to reduce the waiting time from the login of a user to the print completion, and the waiting time of the user before the login time is not considered. Consequently, especially, in a case where a plurality of users and MFPs is present, it is not possible to determine a user to log in, an MFP to be operated and an order of log in, to complete the printing efficiently in less waiting time.

In a case where a plurality of persons are waiting for jobs around a MFP, in terms of waiting time, the overall efficiency is increased by performing a print job of a small amount first, and then, performing last a print job of a large amount. For example, in a case where two persons have input a job of one minute and a job of 100 minutes respectively, if the job of 100 minutes is processed first, the total waiting time of the two persons is 201 minutes, however, if the job of one minute is processed first, the total waiting time is only 102 minutes.

Further, in a case where a plurality of MFPs are provided and a plurality of persons are waiting for jobs in the respective MFPs, since persons approaching the MFPs do not know how long it will take to complete the processing in the individual MFPs, the persons cannot determine in which MFP they can process their jobs in a shortest time. As described above, in a case where some persons are required to wait for a print job of a large amount and there are some MFPs which can perform printing faster, the overall efficiency may be low.

SUMMARY OF THE INVENTION

According to an aspect of the present invention, a job processing apparatus includes a holding unit configured to hold jobs, an imaging unit configured to image a plurality of users, a detecting unit configured to detect face information of the plurality of users imaged by the imaging unit, a recognizing unit configured to recognize the plurality of users based on the face information detected by the detecting unit, a searching unit configured to search the holding unit for jobs of the plurality of users recognized by the recognizing unit, a determining unit configured to determine, based on processing time of the jobs searched by the searching unit, an order of executing the jobs searched by the searching unit, and a display unit configured to display information indicating the users corresponding to the jobs ordered by the determining unit in the order of executing the jobs determined by the determining unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 is a flowchart illustrating a method of controlling the job processing apparatus.

DESCRIPTION OF THE EMBODIMENTS

Various exemplary embodiments, features, and aspects of the invention will be described in detail below with reference to the drawings.

The present invention is not limited to the exemplary embodiments described below. Further, the present invention is not limited to all of combinations of features described in the exemplary embodiments below to solve the problems in the present invention.

<Description of System Configuration>

In the first exemplary embodiment, a job processing apparatus is a multifunction peripheral (MFP) for printing an electronic document, producing a hard copy of paper, or performing facsimile communication. Further, it is assumed that the person using the MFP has input a job. These days, various types of jobs are processed in MFPs, and the printing methods are not limited to the general method of inputting a job to a specific MFP. For example, a job is input to a specified MFP, then, the MFP is logged in via a UI panel, and the printing starts. Alternatively, a job is input to a network without specifying a MFP, an arbitrary MFP is logged in, and the printing is performed.

In this exemplary embodiment, in the above two cases of logging into a MFP in front of the MFP and starting the printing, it is assumed that a plurality of users gather around the MFP that is performing the job. In these conditions, a system for displaying a recommended login order so that overall waiting time becomes shortest after completion of the job execution is described.

Figure 1:
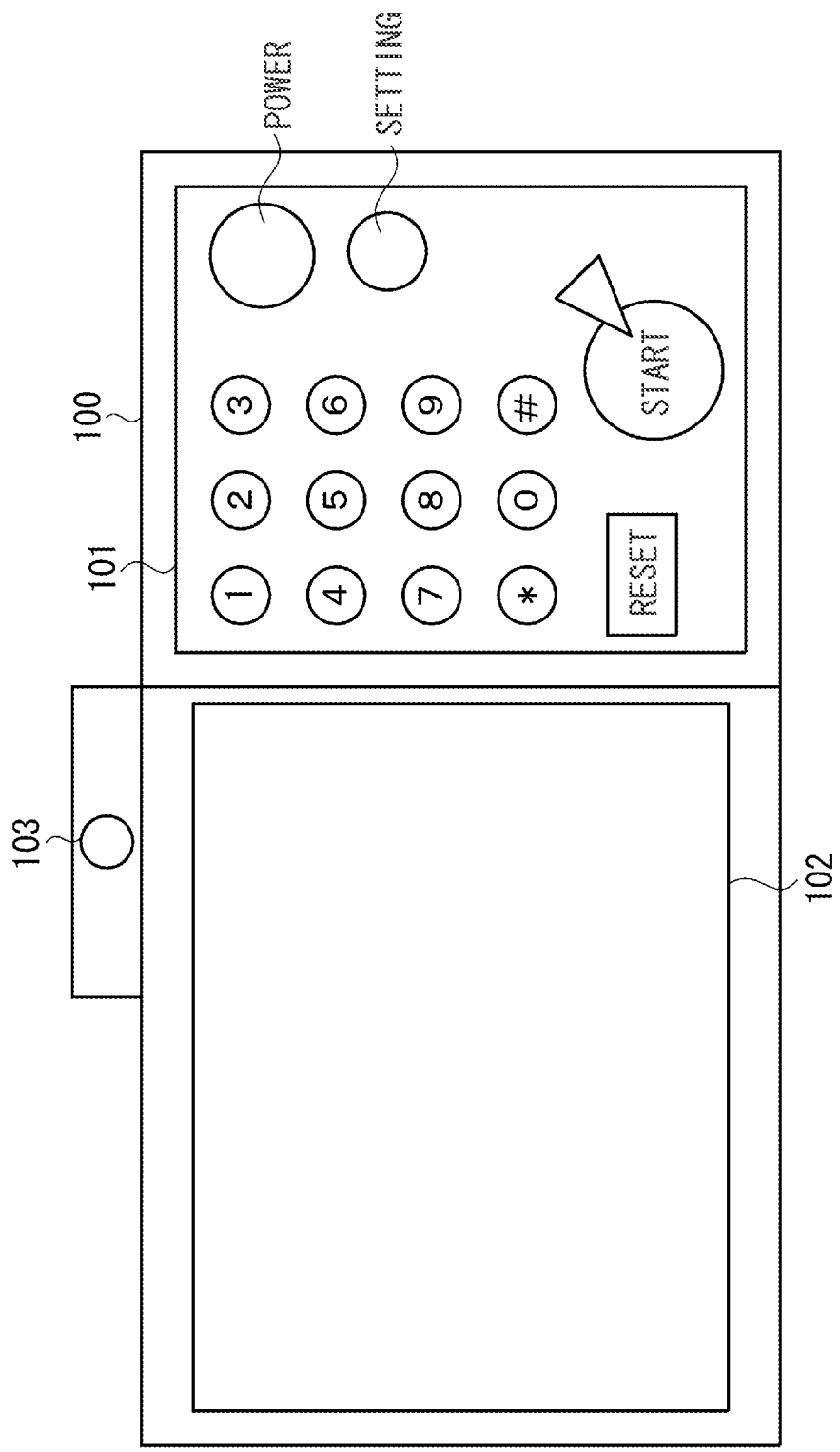
FIG. 1 illustrates an operation unit in a job processing apparatus according to the exemplary embodiment.

FIG. 1 illustrates an operation unit in a job processing apparatus according to the exemplary embodiment.

In FIG. 1, an operation unit 100 includes hardware keys 101 for performing various setting and printing operation, a touch panel-equipped display 102, and a camera 103. The display 102 displays various kinds of information and virtual buttons. An electronic device performs various kinds of processing according to the content displayed on the display 102, information input via the touch panel provided in the display, or an input via the hardware keys 101. The camera 103 can be connected to a MFP 200 such that an image capturing direction of the camera 103 is adjustable using a camera interface (I/F) 103B illustrated in FIG. 2. The camera 103 is used as an image capturing unit for imaging a plurality of users. The information about the captured individual user image is temporarily stored in a random access memory (RAM) 203, or the like.

Figure 2:
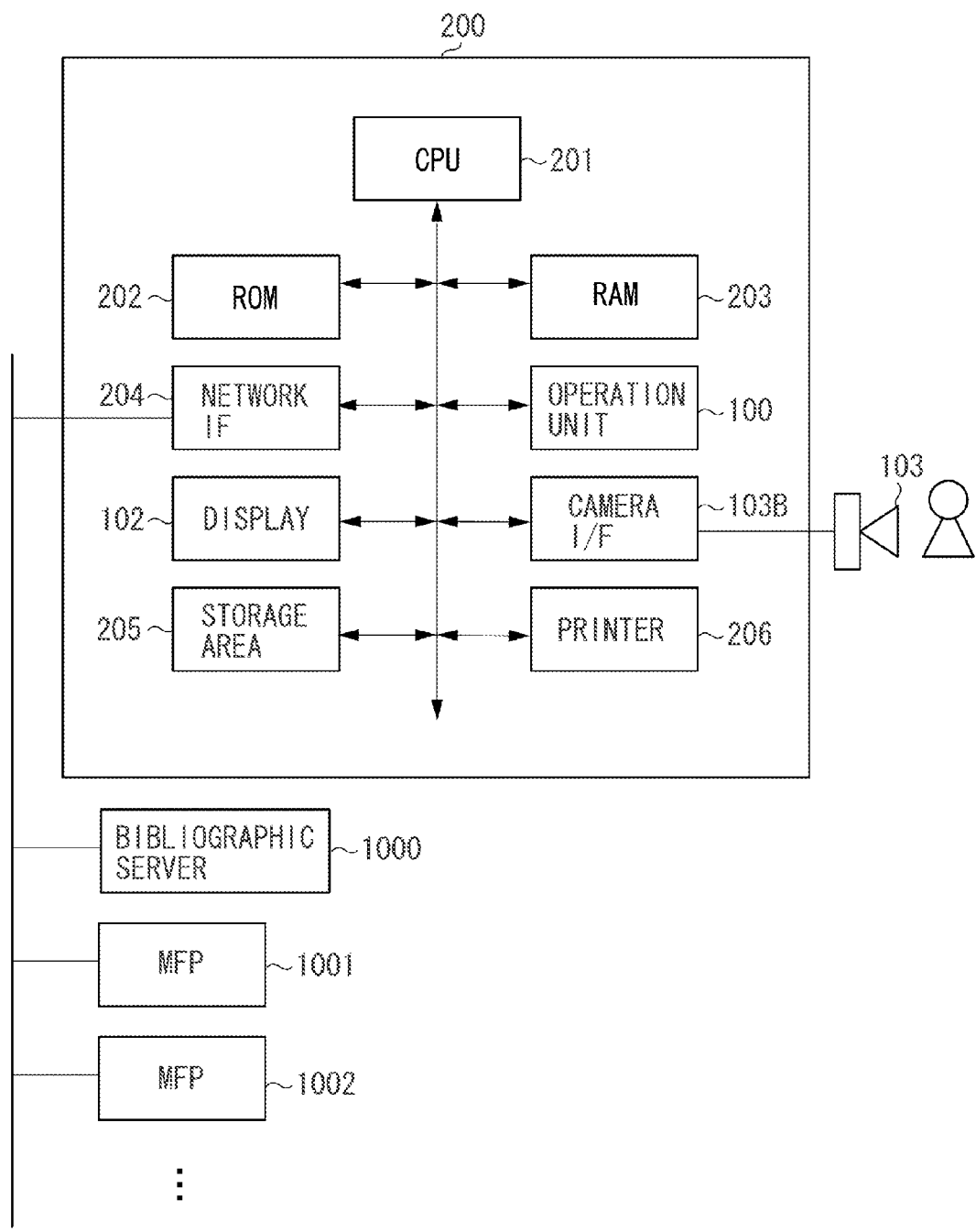
FIG. 2 is a block diagram illustrating a configuration of the job processing apparatus according to the exemplary embodiment.

FIG. 2 is a block diagram illustrating a configuration of the job processing apparatus according to the exemplary embodiment. In this exemplary embodiment, the MFP 200 serves as the job processing apparatus. In this exemplary embodiment, a system in which the MFP 200 can communicate with a bibliographic server 100, with and MFPs 1001 and 1002 via a network is described.

In FIG. 2, a central processing unit (CPU) 201 reads a control program stored in a read-only memory (ROM) 202 or a storage area 205 and performs overall control of the MFP. All of the programs described below operate on the CPU 201. The ROM 202 stores information, for example, stores a control program. The RAM 203 is used as a main memory or a temporary storage area such as a work area of the CPU 201. The RAM 203 stores various kinds of job information input to the MFP. The RAM 203 is also used as a storage area for storing a job to be processed.

If a job input by a user is for a specified MFP, the job information is stored in the RAM 203. Meanwhile, if a job is input to a device other than the specified MFP such as a server, the job information is stored in an external MFP or a server connected via a network interface 204. The job information includes an identifier of the user who has input the job, and a job status. The job stored in the MFP is managed as a job list.

The network interface 204 is used to communicate with an external device, and other devices. The operation unit 100 is used to control input information of the hardware keys 101 or the touch panel provided in the display 102 illustrated in FIG. 1.

The display 102 displays a user interface image formed in a video memory by the CPU 201, or the like. The video memory can be provided in the RAM 203 or in the display 102 itself. The camera 103 is used to capture an image in front of the operating unit. A printer 206, based on a command input via the operation unit 100 in FIG. 1 or the network interface 204, performs print processing on a sheet. These components are interconnected by an internal bus 207.

The MFP 200 according to the exemplary embodiment detects a person who will be a login candidate by capturing an image in front of the operation unit with the camera 103. Then, the MFP 200 acquires a stored job of the detected person from the RAM 203, the storage area 205, or an external server or another MFP connected via the network interface 204. The MFP 200, based on the volume of the acquired jobs, displays a recommended login order, which will be described below, on the display 102.

Figure 3:
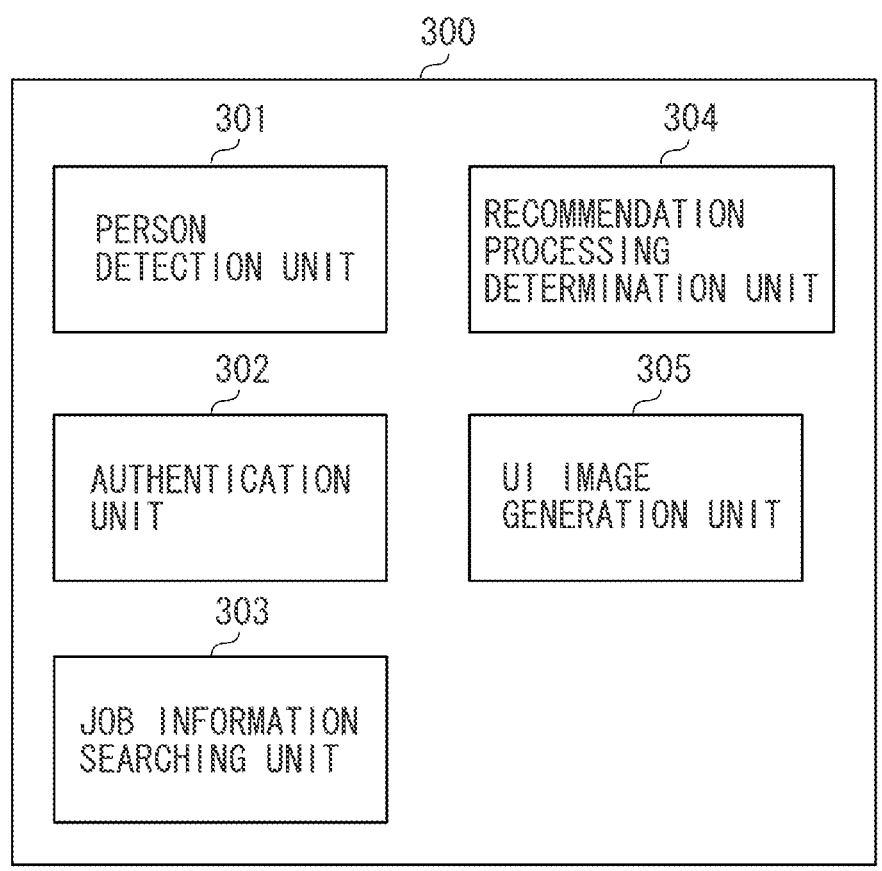
FIG. 3 illustrates a module configuration in the job processing apparatus according to the exemplary embodiment.

FIG. 3 illustrates a module configuration in the job processing apparatus according to the exemplary embodiment. In this exemplary embodiment, an example of software modules relating to processing starting from detection of a plurality of persons to display of a recommended login order in the MFP 200 illustrated in FIG. 2 will be described. The software modules 301 to 305 in FIG. 3 are stored in the ROM 202. The software modules are read into the RAM 203 and executed by the CPU 201 illustrated in FIG. 2.

In FIG. 3, a person detection unit 301 is a software module for detecting persons around the MFP 200 by operating the camera 103, and identifying a person to be authenticated. An authentication unit 302 is a software module for determining whether to permit the person identified by the person detection unit 301 to operate the MFP 200.

A job information searching unit 303 is a software module for finding where and what type of job the person authenticated by the authentication unit 302 has input, based on a user identifier. A recommendation processing determination unit 304 is a software module for analyzing the job information acquired by the job information searching unit 303 to estimate processing time of the job and determine a recommended login order. The determination result is stored in the RAM 203 or storage area 205. A UI image generation unit 305 displays the result in the recommendation processing determination unit 304 on the display 102.

Figure 4:
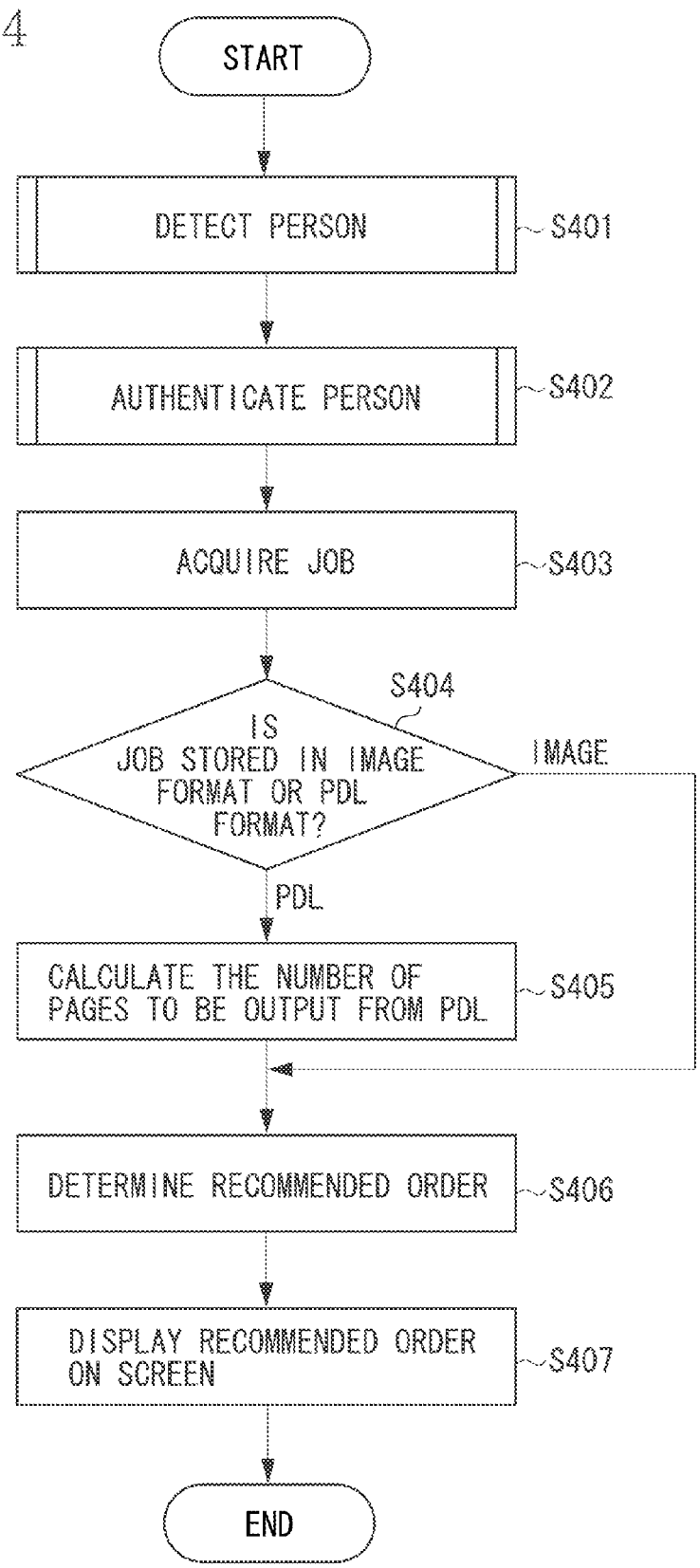
FIG. 4 is a flowchart illustrating a method of controlling the job processing apparatus according to the exemplary embodiment.

FIG. 4 is a flowchart illustrating a method of controlling the job processing apparatus according to the exemplary embodiment. This exemplary embodiment describes an example of processing in the recommended login display system. In this exemplary embodiment, processing for authenticating persons around the MFP 200, analyzing job information of the persons, and displaying a recommended login order is described. Each step is implemented by the CPU 201 illustrated in FIG. 2 by loading the modules illustrated in FIG. 3 from the ROM 202 to the RAM 203 and executing the modules.

In step S 401, the person detection unit 301 illustrated in FIG. 3 performs processing for detecting persons. The person detection processing is described below in detail with reference to FIG. 5. In step S401, processing for identifying persons in front of the operation unit of the MFP is performed.

In step S402, the authentication unit 302 illustrated in FIG. 3 verifies whether the identified persons have the authority to use the MFP 200. By the processing, information of the persons in front of the operation unit 100 of the MFP 200 can be obtained from the list of the persons. The processing for verifying whether the identified persons have the authority to use the MFP 200 will be described in detail with reference to FIG. 6.

In step S403, the job information searching unit 303 acquires job information input by the persons from the list of the persons acquired in step S402. Specifically, the job information searching unit 303 searches the RAM 203 for jobs of the individual authenticated users. The processing for acquiring the job information input by the persons will be described in detail below with reference to FIG. 7.

In step S404, the recommendation processing determination unit 304 determines the storage formats of the acquired jobs. Specifically, in the processing performed until step S403, the job formats of the authenticated persons in front of the operation unit 100 of the MFP 200 are determined. In a case where the format of the input job is not a format of a rendering-processed image but a page description language (PDL) format, in the processing for determining a recommended order in step S407, which will be described below, it is not possible to determine the number of pages to be output.

For this reason, in step S404, the recommendation processing determination unit 304 determines whether the format of the target job is a PDL format or an image format. If the recommendation processing determination unit 304 determines that the job format is a PDL format (PDL in step S404), the CPU 201 moves the process to step S405. If the recommendation processing determination unit 304 determines that the job format is an image format (IMAGE in step S404), the CPU 201 moves the process to step S406.

In step S405, the recommendation processing determination unit 304, using the above-described method, calculates the number of pages to be output from the PDL. As the method of calculating the number of pages to be output from the PLD, a known technique can be used. For example, some PLD formats describe the total number of pages within the PDL in advance. In such a case, the number of pages to be output can be acquired. If the total number of pages is not described, a method of performing syntax analysis on the information of the PDL-format electronic document can be used to count the number of pages. In a case where a setting for printing a plurality of pages on one sheet such as N-in-1 printing or two-sided printing has been made, first, the individual pages are allocated to each sheet, and then, the number of pages to be output can be calculated. By the processing until step S405, the number of pages to be output can be acquired with respect to the job of the authenticated person. In this exemplary embodiment, in step S403, each processing time of the searched jobs is calculated.

In step S406, the recommendation processing determination unit 304 determines a recommended login order in ascending order from the smallest number of pages to be output. In this exemplary embodiment, in step S405, the recommended order for performing the individual jobs is determined based on the calculated processing time of the individual jobs. In step S406, the recommendation processing determination unit 304 sorts the list of persons in the determined order, and stores the order in the RAM 203.

Figure 5:
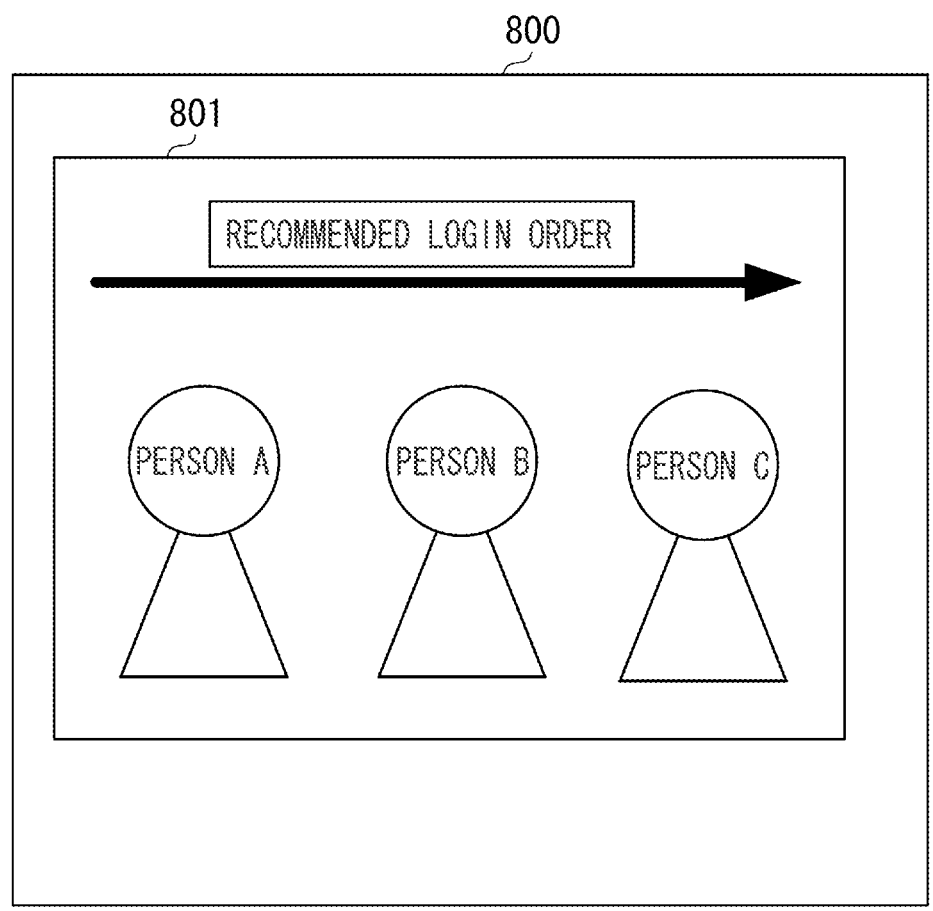
FIG. 5 illustrates an example of user interface (UI) screens to be displayed on the display illustrated in FIG. 2.

In step S407, the UI image generation unit 305 displays the list of the persons sorted in step S406 using an UI screen 800 in the recommended order on the display 102 as illustrated in FIG. 5, and ends this processing. In this exemplary embodiment, the user information associated with the individual jobs, of which the recommended order has been determined in step S406, is displayed in the job execution order.

FIG. 5 illustrates an example of the UI screen to be displayed on the display 102 illustrated in FIG. 2. In this example, user information associated with individual jobs, of which the recommended order has been determined according to processing described below, is displayed in a job execution order. In this case, the person A, the person B, and the person C have been recognized, and the job of the person A is to be executed first. In this example, the user login order is being displayed. This order corresponds to a job execution order determined according to the processing described below, and this order is the same as the recommended order. In FIG. 5, on the display screen 801 of the UI screen 800, a recommended login order of the authenticated persons is being displayed. The recommended login order shows a state that the recommended order of the user A at the left side in the drawing is higher than the user B and the user C indicated by the arrow. Hereinafter, the processing illustrated in FIG. 4 is described in detail.

Figure 6:
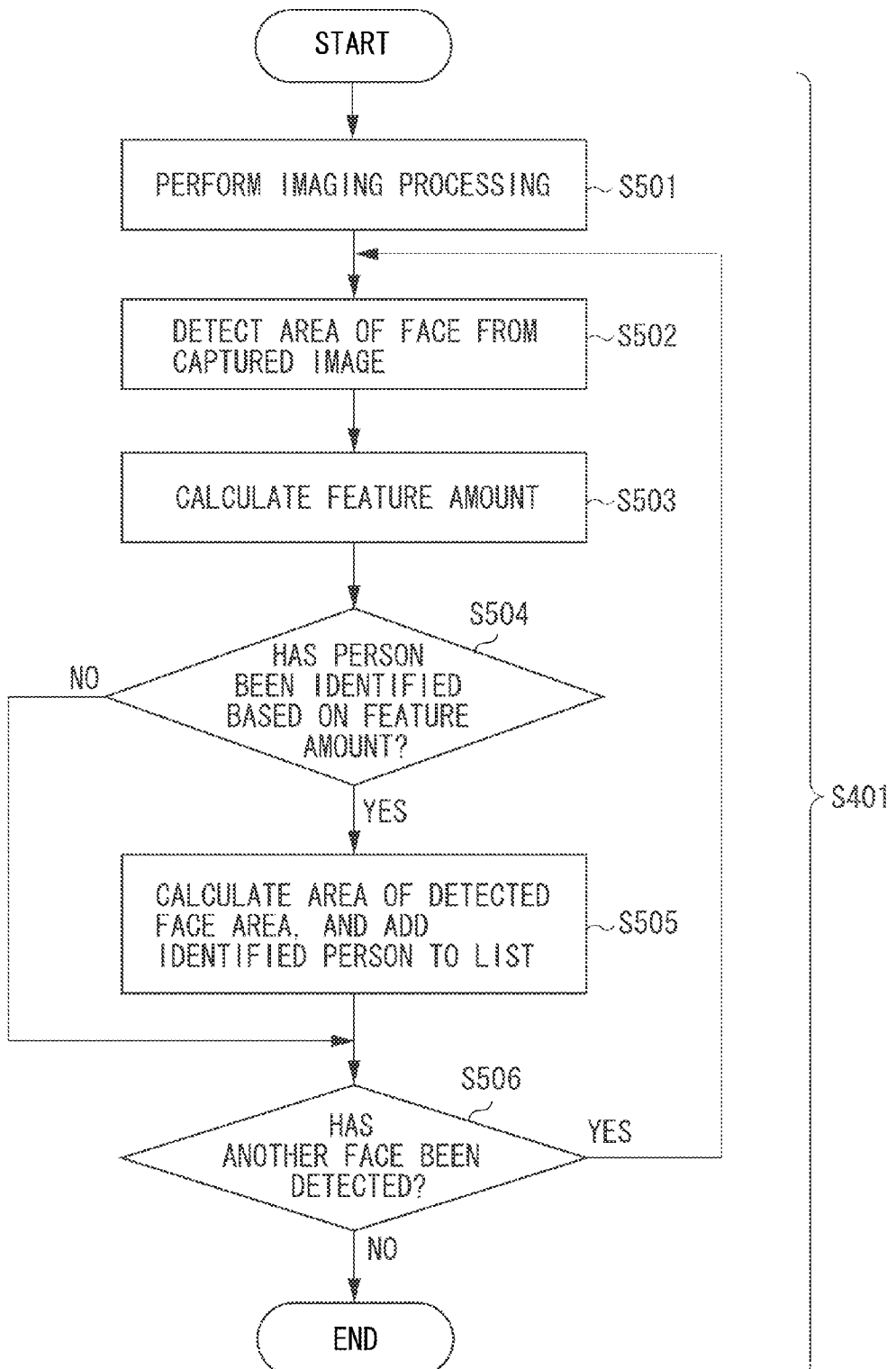
FIG. 6 is a flowchart illustrating a method of controlling the job processing apparatus.

FIG. 6 is a flowchart illustrating a method of controlling the job processing apparatus according to the exemplary embodiment. In this exemplary embodiment, an example of the processing in step S401 illustrated in FIG. 4 which is performed by the person detection unit 301 is described. Each step is implemented by the CPU 201 illustrated in FIG. 2 by loading the modules illustrated in FIG. 3 from the ROM 202 to the RAM 203 and executing the modules. In the description below, the control is described as performed according to the modules. Hereinafter, processing for detecting face information from image information of the individual users is described in detail.

In step S501, the person detection unit 301 controls the camera 103 to capture an image of users around the MFP 200. The captured images of the users are temporarily stored in the RAM 203 as bitmap images. In step S502, the person detection unit 301 performs image processing on the captured images of the users temporarily stored in the RAM 203, and searches all areas where faces of the persons are being displayed. In this exemplary embodiment, as the method of searching the areas where faces of the persons are being displayed, a Haar-like feature classification method is used. The feature amount data with respect to human faces is created through machine learning in advance.

Generally, in the Haar-like feature classification, normalization processing such as gray-scale transformation and edge detection processing is performed on input images. Since these techniques are not related to the present invention, its description is omitted. In step S503, the person detection unit 301, with respect to the image areas detected in step S502, using an Eigenface method, calculates feature amounts (vectors).

In step S504, the person detection unit 301 determines whether the detected persons are identified, using the feature amounts obtained in step S503. In the identification of the persons, a database is used in which the feature amounts calculated by the Eigenface method in advance and personal information including identification information are associated with each other. This database is stored in a server connected to the MFP 200 via the network interface. In step S504, if the person detection unit 301 determines that no person is identified (NO in step S504), the process proceeds to step S506.

The person detection unit 301 compares the feature amounts registered in the database with the calculated feature amounts to identify persons. If the person detection unit 301 determines that a person is identified (YES in step S504), in step S505, the person detection unit 301 calculates the area of the face region of the user detected in step S502. Then, the person detection unit 301 adds the calculated area together with the identification information of the person identified from the database to a list of persons, which is passed to the authentication unit 302. The list of persons to be passed to the authentication unit 302 is generated in the RAM 203.

In step S506, the person detection unit 301 determines whether the above-described processing has been performed on all of the individual face regions of the users detected in step S502. If the person detection unit 301 determines that another face of the users is not detected (No in step S506), this processing ends. On the other hand, if the person detection unit 301 determines that another user face has been detected (Yes in step S506), the process returns to step S502, and similar processing is performed.

Figure 7:
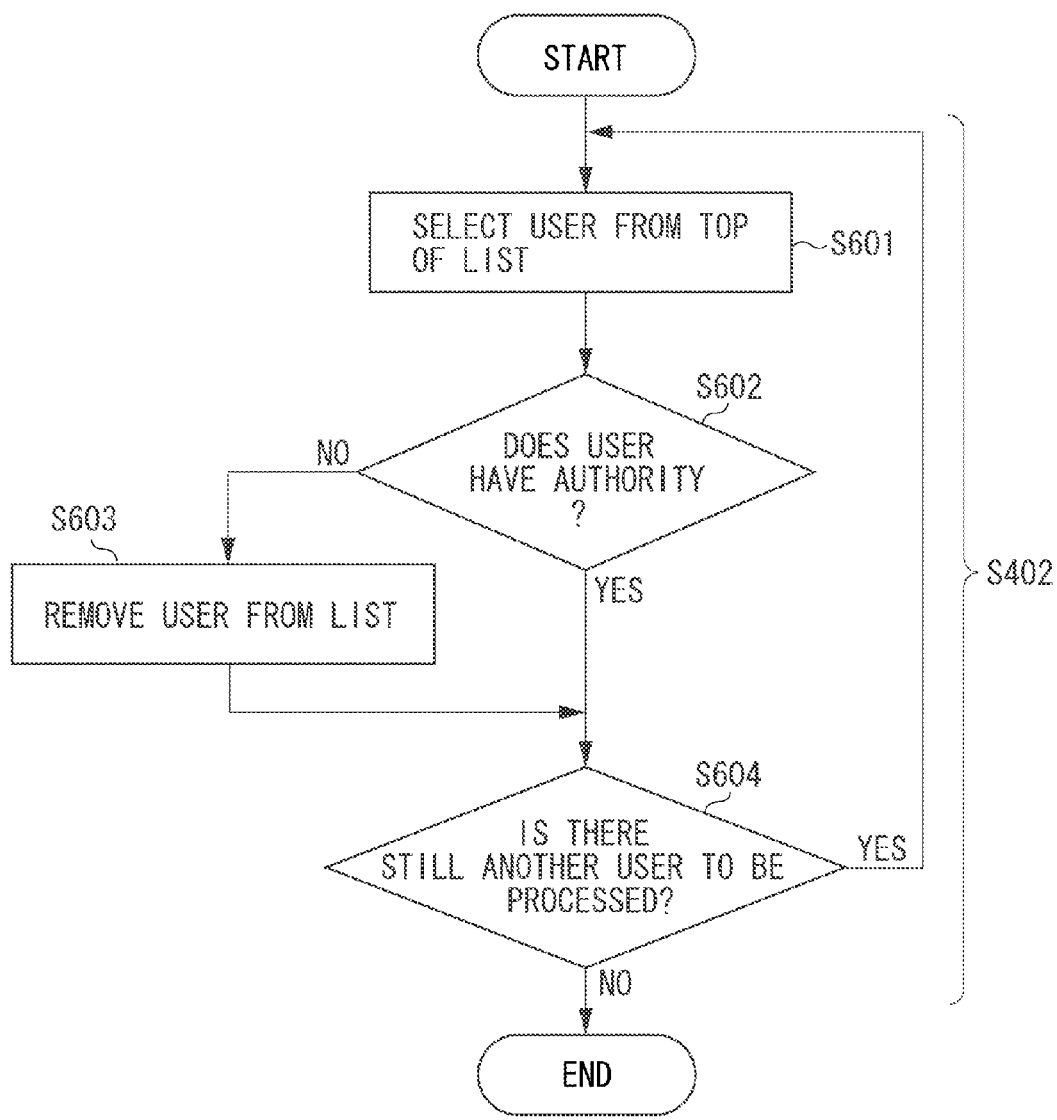
FIG. 7 is a flowchart illustrating a method of controlling the job processing apparatus.

FIG. 7 is a flowchart illustrating a method of controlling the job processing apparatus according to the exemplary embodiment. In this exemplary embodiment, an example of the processing in step S402 illustrated in FIG. 4 which is performed by the authentication unit 302 is described in detail. Each step is implemented by the CPU 201 illustrated in FIG. 2 by loading the modules illustrated in FIG. 3 from the ROM 202 to the RAM 203 and executing the modules. In the description below, the control is described as performed according to the modules. In the processing in step S401 illustrated in FIG. 4, the persons (users) in front of the operation unit 100 of the MFP 200 are identified. In step S402, whether the identified persons have the authority to use the MFP 200 is determined. Hereinafter, the processing in step S401 for verifying the information of the detected individual faces against the face information of the registered users is described in detail. The processing determines whether the users are authorized and their jobs can be received.

In step S601, the authentication unit 302 selects one person from the list (stored in the RAM 203) of the persons identified in step S401. In step S602, the authentication unit 302, using the identification information of the selected person, determines whether the person has the authority to use the MFP 200. In this determination processing, the above-described database (for example, the database is stored in the storage area 205) can be used. In this case, identification values of available electronic devices are registered in the personal information of the database.

The authentication unit 302 can determine whether the authenticated person has the authority to use the MFP 200, based on the identification values of the devices, the identification information of the person to be verified, and the personal information registered in the database. Alternatively, as a database other than the above-described database, the list of the identification information of the persons permitted to use the MFP 200 can be registered in a server (not illustrated) to make the determination using such database.

If the authentication unit 302 determines that the person selected in step S601 does not have the authority to use the MFP (NO in step S602), in step S603, the authentication unit 302 removes the person from the list of the persons identified in step S401, and the process proceeds to step S604.

In step S604, with respect to all persons included in the list of the persons, the authentication unit 302 determines whether there is still another user to be processed. If the authentication unit 302 determines that the above-described processing has been performed with respect to all users (YES in step S604), the processing ends. If the authentication unit 302 determines that the above-described processing has not been performed with respect to all users (NO in step S604), the process returns to step S601, and similar processing is repeated.

In the above-described case, when the identified persons have the authority to use the MFP 200, the persons are not removed from the list. However, authentication may be performed only based on user names and passwords. In such a case, an attribute indicating that login by the person detection unit 301 is not permitted can be provided in the above-described database. Thereby, a certain person can be always removed from the list of persons.

Figure 8:
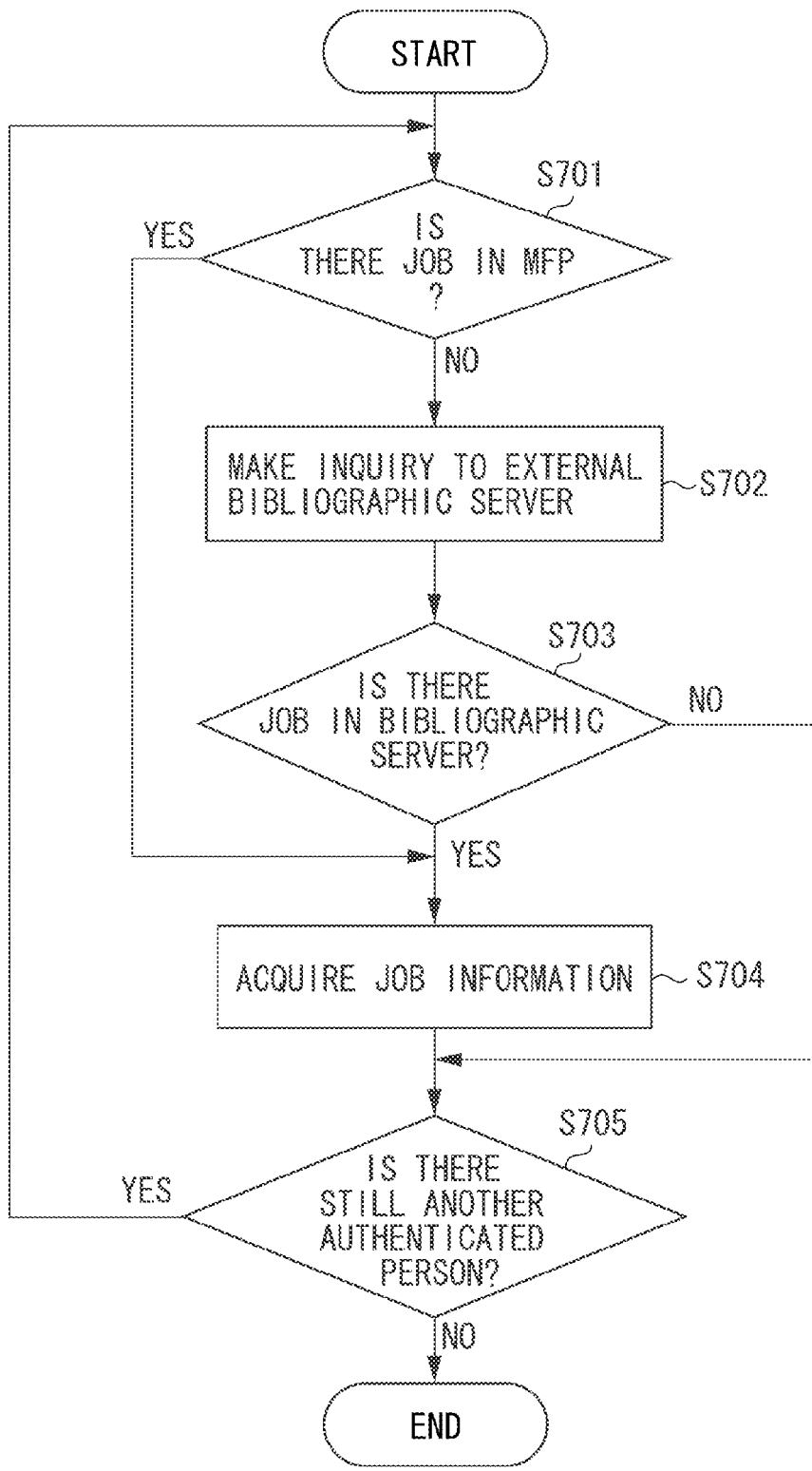
FIG. 8 is a flowchart illustrating a method of controlling the job processing apparatus.

FIG. 8 is a flowchart illustrating a method of controlling the job processing apparatus according to the exemplary embodiment. In this exemplary embodiment, an example of the processing in step S403 illustrated in FIG. 4 which is performed by the job information searching unit 303 is described in detail. Each step is implemented by the CPU 201 illustrated in FIG. 2 by loading the modules illustrated in FIG. 3 from the ROM 202 to the RAM 203 and executing the modules. By the processing until step S402 illustrated in FIG. 4, the information of the persons in front of the operation unit of the MFP 200 can be obtained from the list of the persons. In step S403, from the list of the persons, job information input by the person is acquired.

In step S701, the job information searching unit 303, from the identification information of the list of the authenticated persons acquired in step S402, determines whether a jobs of the person is included in the job list stored within the MFP 200. In this case, the job information searching unit 303 compares the login ID of the authenticated person as the identification information with the ID of the person who has input the job to the job list.

The job information searching unit 303 checks the jobs. If the job information searching unit 303 determines that the job of the authenticated person is not included in the MFP 200 (NO in step S701), in step S702, the job information searching unit 303 makes an inquiry to an external bibliographic server 1000 via the network interface 204. The bibliographic server 1000 includes information of the MFP 200 storing the job which is connected through the network and addresses of the job storage destination within the MFP 200.

In step S703, the job information searching unit 303 determines whether the job of the authenticated person is included in the bibliographic server 1000. Detailed configuration of the external server, and the like of the MFP 200 are not related to the present invention, and therefore, its description is omitted. Other than the above-described system of the bibliographic server 1000, any system configuration can be used as long as the job information of the authenticated persons can be obtained from an external storage area of the MFP 200.

By the above-described steps, whether the jobs of the authenticated persons are included in the MFP 200 or the external storage area can be determined.

In step S703, if the job information searching unit 303 determines that the job of the authenticated persons is included (YES in step S703), in step S704, the job information searching unit 303 acquires the job information from the job storage destinations and adds the information to the job list. In this step, the job information searching unit 303 associates the information about the authenticated person in the list of the person with the job information in the job list. If the job information searching unit 303 determines that no job has been found (NO in step S703), the information searching unit 303 determines that the person has not input job, and ends the processing.

In step S705, the job information searching unit 303 determines whether the above-described processing has been performed on all of the authenticated persons. If the job information searching unit 303 determines that there is still another authenticated person (YES in step S705), the process returns to step S701. If the job information searching unit 303 determines that there is no authenticated person (NO in step S705), this processing ends.

In this exemplary embodiment, images of the persons around the MFP 200 are captured by the camera 103, and based on the feature information of the persons, the persons are authenticated. Thereby, the jobs of the persons can be obtained. Consequently, the processing (including the processing of rasterizing a PDL into image information) of the jobs can be performed in advance, and after login processing, the print processing can be immediately performed.

Figure 9:
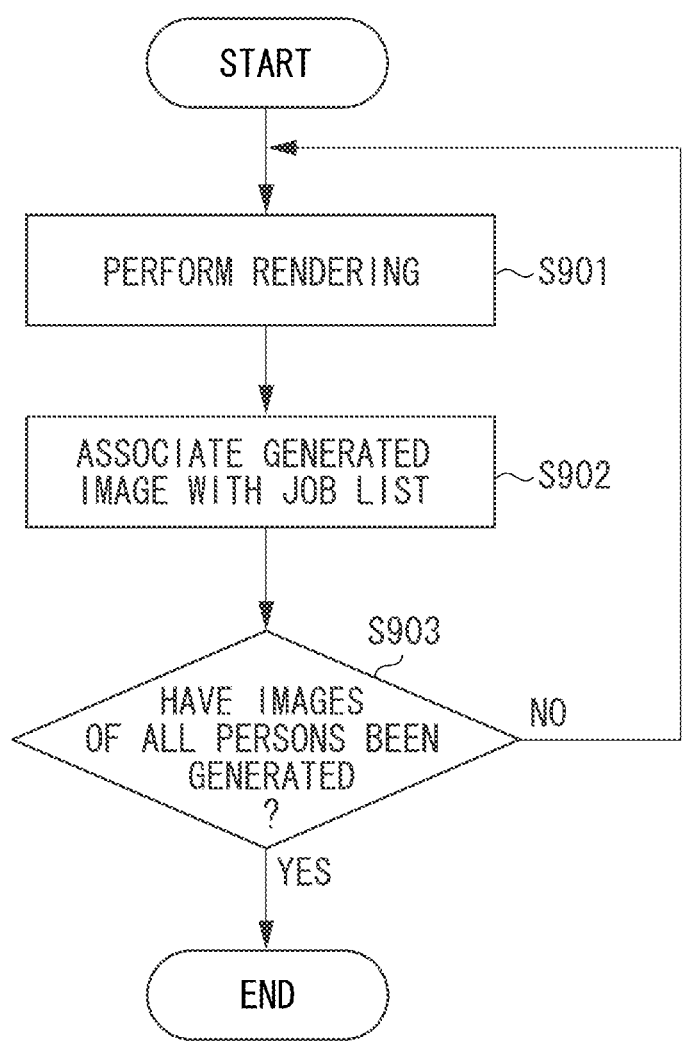
FIG. 9 is a flowchart illustrating a method of controlling the job processing apparatus.

FIG. 9 is a flowchart illustrating a method of controlling the job processing apparatus according to the exemplary embodiment. In this exemplary embodiment, an example of the processing for pre-rendering a PDL to be performed after step S407 illustrated in FIG. 4 is described in detail. The pre-rendering of a PDL is performed by the CPU 201 illustrated in FIG. 2. Each step is implemented by the CPU 201 illustrated in FIG. 2 by loading the modules illustrated in FIG. 3 from the ROM 202 to the RAM 203 and executing the modules.

As described above, after the recommended login order is displayed on the display 102 using the UI screen 800 illustrated in FIG. 5 in step S407, the CPU 201 searches for a job of the person at the top of the list of the persons. In step S901, if the CPU determines that the format of the searched job of the person is a PDL format, the CPU 201 instructs the printer 206 to perform rendering.

In step S902, the CPU 201 stores the generated image in the RAM 203 or the storage area 205, and associates the image with the job list. In step S903, the CPU 201 determines whether images of all persons have been generated in the order of the list of the persons. If the CPU 201 determines that images of all persons have been generated (YES in step S903), this processing ends. If the CPU 201 determines that images of not all persons have been generated (NO in step S903), the process returns to step S901, and similar processing is repeated.

According to the processing illustrated in FIG. 4, the rendering processing starts before login of the authenticated person. Consequently, after the login of the person, the printing processing can be immediately performed.

Figure 10:
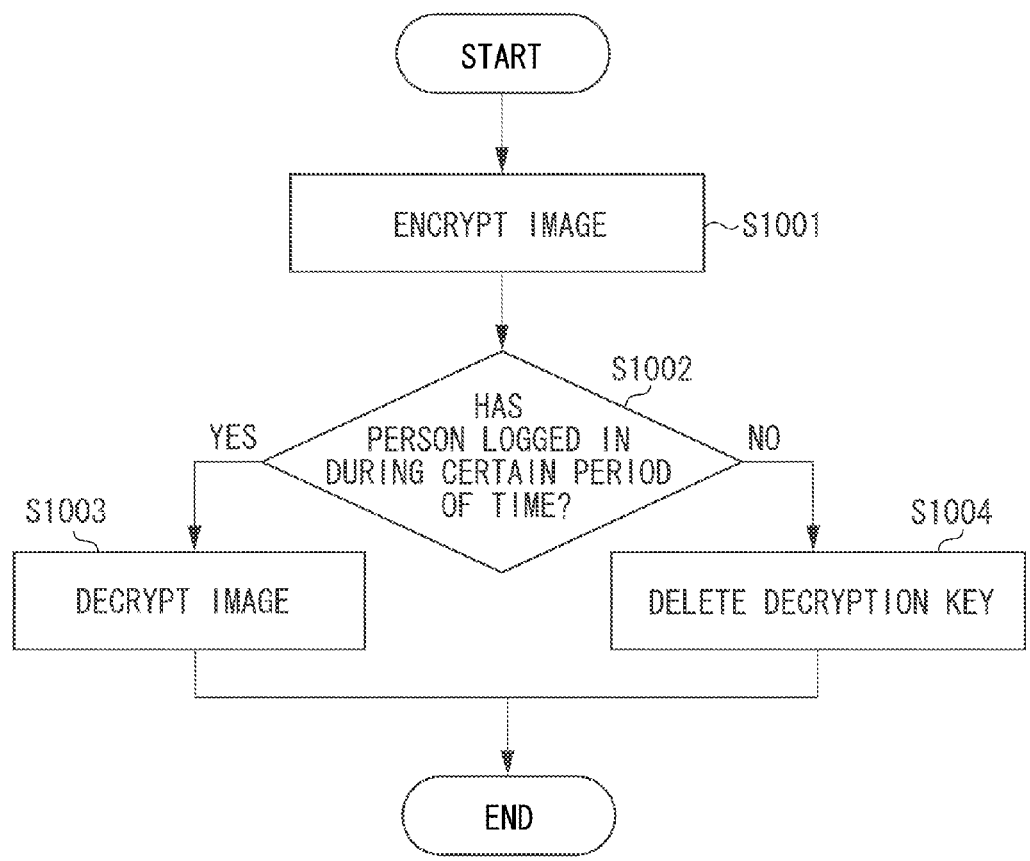
FIG. 10 is a flowchart illustrating a method of controlling the job processing apparatus.

In this exemplary embodiment, according to the processing illustrated in FIG. 4, after the acquisition of the job of the authenticated person (or after the generation of rendered image in a case where the job format is a PDL format), the authenticated person may leave the MFP 200 without logging in the MFP 200. In such a case, the image can be encrypted according to a certain method by the CPU 201 to prevent the image from leaking out to enhance the confidentiality. FIG. 10 is a flowchart illustrating the processing.

FIG. 10 is a flowchart illustrating a method of controlling the job processing apparatus according to the exemplary embodiment. In this exemplary embodiment, an example of the confidentiality processing performed by the CPU 201 illustrated in FIG. 2 is described in detail. Each step is implemented by the CPU 201 illustrated in FIG. 2 by loading the modules illustrated in FIG. 3 from the ROM 202 to the RAM 203 and executing the modules.

In step S1001, the CPU 201 performs encryption processing on a target image, and associate a key for decryption with the job list and store the associated information in the RAM 203 or the storage area 205. There are currently various techniques for encryption. Detailed description of the techniques is omitted since the present invention is not directed to such techniques.

For the sake of simplicity, the CPU 201 encrypts the image, generates the decryption key in the encryption processing, and decrypts the image using the decryption key.

In step S1002, the CPU 201 determines whether the person corresponding to the encrypted image has logged into the MFP 200 in a certain period of time (within a certain period of time that the administrator of the MFP 200 can set). If the CPU 201 determines that the person has logged into the MFP 200 in the period of time (YES in step S1002), in step S1003, the CPU 201 decrypts the encrypted image in the job list with the corresponding key, and ends the processing.

Through the processing, the person can perform the intended print processing.

If the CPU 201 determines that the person has not logged into the MFP 200 in the period of time (NO in step S1002), in step S1004, the CPU 201 deletes the key associated with the job list, and ends the processing. Instead of the processing in step S1004, the CPU 201 can perform control to abandon the encrypted image.

In the first exemplary embodiment, one MFP is used by a plurality of persons. In the second exemplary embodiment, a plurality of MFPs are provided, and a person in front of any one of the MFPs is recommended through the display to perform his processing using another MFP which can process his job in a shortest time. The hardware configuration according to this exemplary embodiment is similar to that in FIG. 2 according to the first exemplary embodiment, and therefore, the description of the configuration is omitted.

Figure 11:
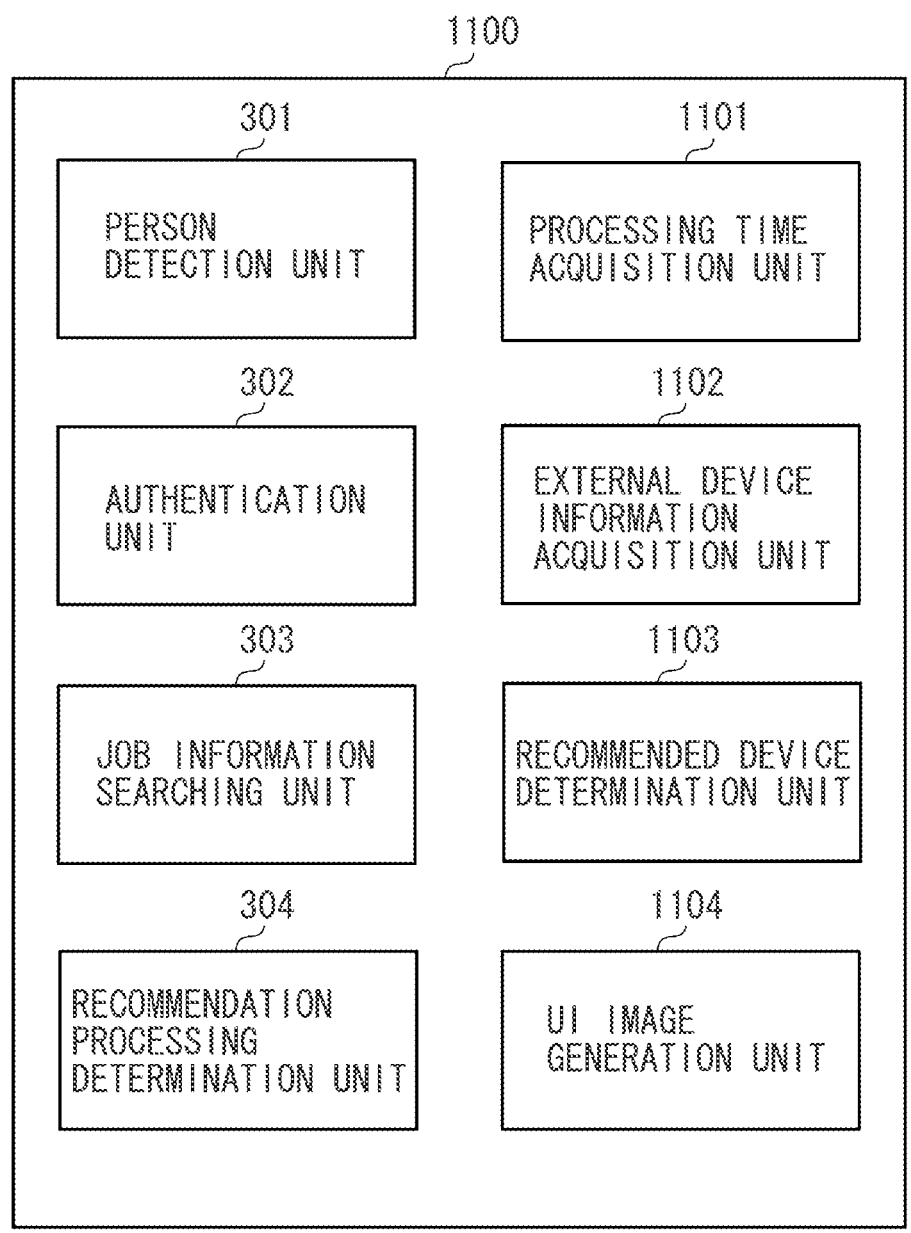
FIG. 11 illustrates a module configuration in a job processing apparatus.

FIG. 11 illustrates a module configuration in the job processing apparatus according to the exemplary embodiment. In this exemplary embodiment, an example of a software module is described which relates to processing starting from detection of a plurality of persons by a MFP to processing for displaying a recommendation to perform the processing in the other MFPs 1001 or 1002 (see FIG. 1).

In a software module 1100 illustrated in FIG. 11, the person detection unit 301, the authentication unit 302, the job information searching unit 303, and the recommendation processing determination unit 304 are similar to those described in the first exemplary embodiment, and therefore, the description of the components is omitted.

In FIG. 11, a processing time acquisition unit 1101 is a software module for counting the total number of pages to be output based on job information of persons in a list of the persons stored in the MFP 200 and estimating processing completion time. The result is stored in the RAM 203 or storage area 205. An external device information acquisition unit 1102 is a software module for acquiring, from another MFP 200 around the MFP 200 connected via the network interface 204, the processing completion time in the MFP 200.

A recommended device determination unit 1103 is a software module for comparing the processing completion time in the MFP 200 with the processing completion time in the MFPs 1001 and 1002 acquired by the external device information acquisition unit 1102, and determining a MFP that can process the processing of the person in a shortest time. A UI image generation unit 1104 is a software module for displaying the information determined in the recommendation processing determination unit 304 and the recommended device determination unit 1103 on the display 102.

All of the software modules 1101 to 1104 illustrated in FIG. 11 are operated on the RAM 203 by the CPU 201.

Figure 12:
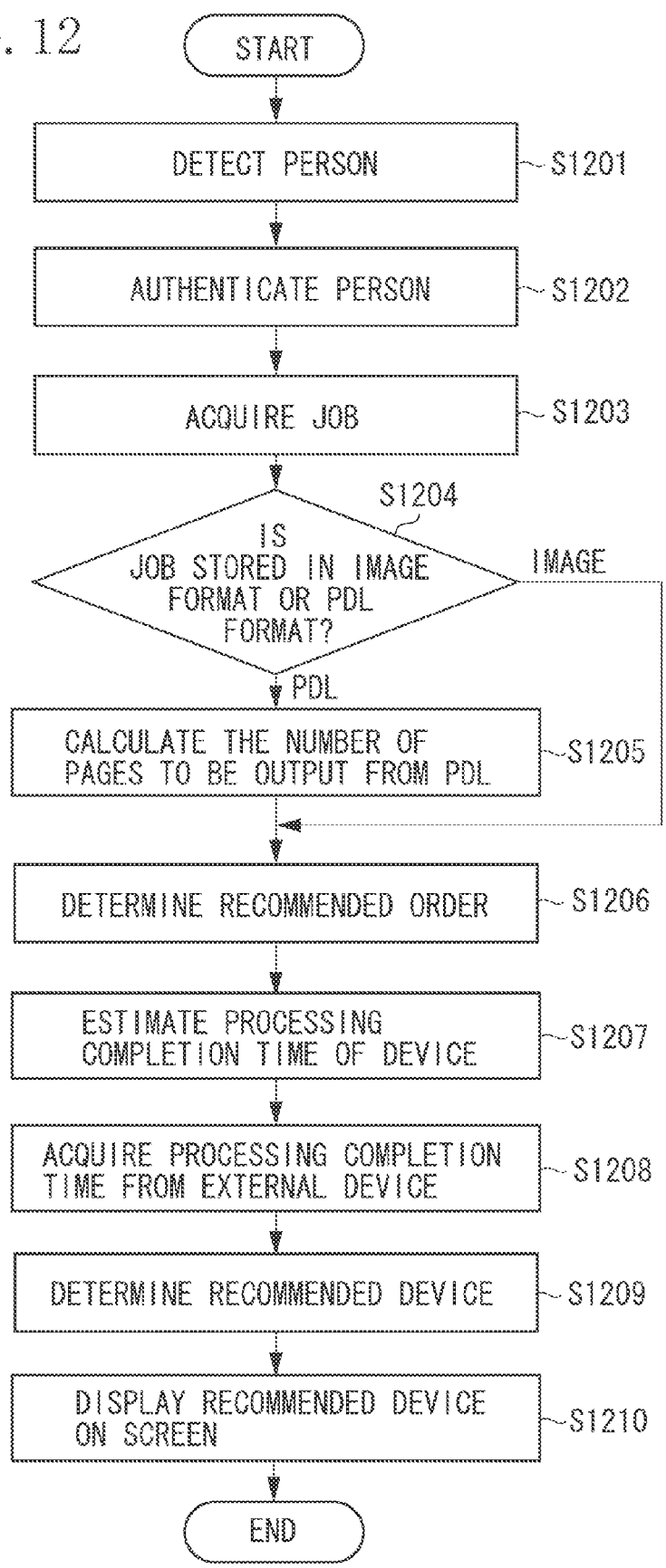
FIG. 12 is a flowchart illustrating a method of controlling the job processing apparatus.

FIG. 12 is a flowchart illustrating a method of controlling the job processing apparatus according to the exemplary embodiment. In this exemplary embodiment, an example of confidentiality processing performed by the software modules illustrated in FIG. 11 is described in detail. Each step is implemented by the CPU 201 illustrated in FIG. 2 by loading the modules illustrated in FIG. 3 from the ROM 203 and executing the modules. Hereinafter, with reference to the individual steps in the flowchart in FIG. 12, the operation of the software modules illustrated in FIG. 11 is described in detail. In the flow in FIG. 12, steps S1201 to S1206 correspond to steps S401 to S406 in FIG. 4, and therefore, the description of the flow is omitted. Processing for determining another job processing apparatus is described that can complete individual jobs in shortest times based on calculated processing time of the individual jobs and a job completion time of a job being processed which is acquired from the other job processing apparatus. Further, processing for displaying another job processing apparatus (the other MFP) specified in this processing is described.

By the processing until step S1206, the number of pages to be output with respect to the person authenticated by the MFP is determined. Then, the processing time acquisition unit 1101 calculates the total number of pages to be output with respect to the jobs of each authenticated person, and estimates the processing completion time of the apparatus. The result of the total sum is stored in the RAM 203 or storage area 205. In this processing, if the time necessary for discharging one sheet in the MFP 200 is known, the time is multiplied by the calculated number of pages to be output to estimate the processing completion time. In this description, however, simply, the total number of pages to be output is used as the processing completion time.

Through the processing until step S1207, the MFP 200 holds the processing completion time of the authenticated persons. In step S1208, the external device information acquisition unit 1102 acquires the processing completion time from individual MFPs communicating with the MFP 200 via the network interface 204, and stores the information in the RAM 203. In this processing, the external device information acquisition unit 1102 acquires lists of persons from the external devices.

Through the processing to step S1208, the processing completion time in the other MFPs 1101, 1102, and other devices connected via the network can be acquired. In step S1209, the recommended device determination unit 1103 determines, based on the acquired processing completion time in the individual MFPs 1101, 1102, and the other devices, a MFP that can complete the processing in a shortest time.

Figure 13:
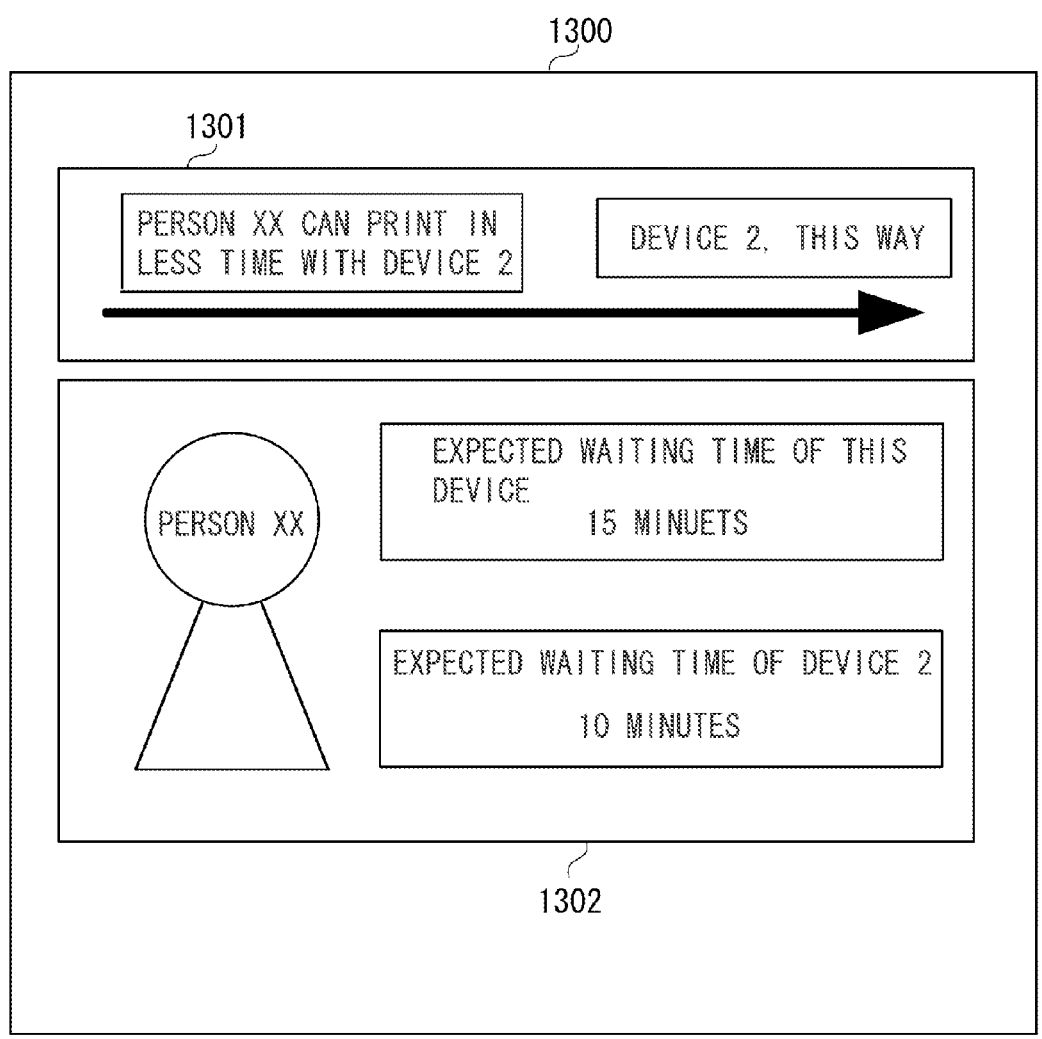
FIG. 13 illustrates an example of UI screens to be displayed on the display illustrated in FIG. 2.

In step S1210, the UI image generation unit 1104, on the display 102, displays a recommended device screen indicating the result of step S1209, for example, on the UI screen 1300 illustrated in FIG. 13, and ends the processing.

In this processing, the UI image generation unit 1104 displays the detailed information of the recommended MFP determined in step S1209 on a recommended device information display unit 1301 for the authenticated person in front of the operation unit 100 of the MFP 200. In order to enhance the usability of the persons, the information acquired in the above-described steps can be displayed for the individual users as shown in the detailed advice information 1302.

Through the above-described processing, it can be recommended to process the jobs of the persons authenticated by the MFP 200 in another MFP such as the MFPs 1101 and 1102. In a case where the job of the authenticated person is stored in the MFP, however, while the person moves to the recommended MFP, the MFP may not have the job and the printing may not be performed. In such a case, at the time that the person moves to the recommended MFP and is authenticated, the job is to be acquired from the original MFP to solve such a problem. This flow is illustrated in FIG. 14.

FIG. 14 is a flowchart illustrating a method of controlling the job processing apparatus according to the exemplary embodiment. In this exemplary embodiment, an example of job transmission processing performed by the software modules illustrated in FIG. 11 is described in detail. Each step is implemented by the CPU 201 illustrated in FIG. 2 by loading the modules illustrated in FIG. 3 from the ROM 203 and executing the modules.

When a recommended MFP is displayed, the device information of the recommended MFP 200 is added to the list of the persons. As long as the MFP can be identified, the device information can be any information, and in this exemplary embodiment, the IP address of the MFP is used as the device information.

In step S1401, the person detection unit 301 detects whether the authenticated person stays around the MFP to determine whether the authenticated person has left the MFP. During the detection, the person detection unit 301 estimates that the person stands in line before the MFP.

In step S1401, if the person detection unit 301 determines that the person has not been detected (YES in step S1401), in step S1402, the external device information acquisition unit 1102 acquires the list of persons in the recommended device such as the MFPs 1101 and 1102. In step S1403, the external device information acquisition unit 1102 determines whether the person is included in the acquired list of persons.

If the external device information acquisition unit 1102 determines that the person is not included (NO in step S1403), the external device information acquisition unit 1102 acquires the list of persons again.

With respect to the acquisition of the list of persons, the acquisition time can be limited, or the number of times of the acquisition can be limited to deal with a case where the person has left the MFP and does not appear in the recommended MFP 1001, 1002, or the like.

On the other hand, in step S1403, if the external device information acquisition unit 1102 determines that the person is included in the acquired list of persons (YES in step S1403), the external device information acquisition unit 1102 determines that the person has left the MFP and moved to the recommended MFP 1001, 1002, or the like. In step S1404, the MFP 200 sends the job information via the network interface 204 to the RAM 203 or the storage area 205 in one of the MFP 1001 and 1002, and ends the processing.

On the UI screen illustrated in FIG. 13, in a case where a button for selecting another MFP is provided and the user can select the button, an instruction to reserve a job in the other MFP can be sent. By this configuration, while the user is moving, another user is prevented from an interruption operation of the jobs in the other job processing apparatus which makes the job processing time longer.

The invention is not limited to the disclosed exemplary embodiments, various modifications (including organic combinations of the exemplary embodiments) can be made without departing from the scope of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-258999 filed Nov. 27, 2012, which is hereby incorporated by reference herein in its entirety.

What is claimed is:

1. A job processing apparatus comprising:
a holding unit configured to hold jobs;
an imaging unit configured to image a plurality of users;
a detecting unit configured to detect face information of the plurality of users imaged by the imaging unit;
a recognizing unit configured to recognize the plurality of users based on the face information detected by the detecting unit;
a searching unit configured to search the holding unit for jobs of the plurality of users recognized by the recognizing unit;
a determining unit configured to determine, based on processing time of the jobs searched by the searching unit, an order of executing the jobs searched by the searching unit; and
a display unit configured to display information indicating the users corresponding to the jobs ordered by the determining unit, in the order of executing the jobs determined by the determining unit.

2. A job processing apparatus comprising:
a holding unit configured to hold jobs;
an imaging unit configured to image a plurality of users;
a detecting unit configured to detect face information of the plurality of users imaged by the imaging unit;
a recognizing unit configured to recognize the plurality of users based on the face information detected by the detecting unit;
a searching unit configured to search the holding unit for jobs of the plurality of users recognized by the recognizing unit;
a specifying unit configured to specify, based on the processing time of the jobs searched by the searching unit and a job completion time of a job being processed which is acquired from another job processing apparatus, a job processing apparatus to process the jobs searched by the searching unit; and
a display unit configured to display the other job processing apparatus specified by the specifying unit.

3. A job processing apparatus according to claim 2, further comprising:
a transmitting unit configured to transmit the jobs to the other job processing apparatus specified by the specifying unit.

4. A job processing apparatus according to claim 1, further comprising:
a determining unit configured to determine whether the format of the job searched by the searching unit is a PDL format or an image data format; and
a rasterizing unit configured to rasterize, in a case where the determining unit determines that the job format is a PDL format, the jobs searched by the searching unit into image data in the order of executing the jobs determined by the determining unit.

5. A job processing apparatus according to claim 4, further comprising:
an encryption unit configured to encrypt the image data rasterized by the rasterizing unit;
a storage unit configured to store the image data encrypted by the encryption unit;
a receiving unit configured to receive a login request from a user; and
a printing unit configured to perform printing, out of the image data stored in the storage unit, based on the image data corresponding to the user whose login request has been received by the receiving unit.

6. A job processing apparatus according to claim 5, further comprising:
a deleting unit configured to delete the image data from the storage unit in case where a predetermined storage time of the image data has passed.

7. A control method for controlling a job processing apparatus, comprising:
holding jobs in a holding unit;
imaging a plurality of users;
detecting face information of the plurality of imaged users;
recognizing the plurality of users based on the detected face information;
searching the holding unit for jobs of the plurality of recognized users;
determining, based on processing time of the searched jobs, an order of executing the searched jobs; and
displaying information indicating the users corresponding to the ordered jobs, based on the determined order of executing the jobs.

8. A control method for controlling a job processing apparatus, comprising:
holding jobs in a holding unit;
imaging a plurality of users;
detecting face information of the plurality of imaged users;
recognizing the plurality of users based on the detected face information;
searching the holding unit for jobs of the plurality of recognized users;
specifying, based on the processing time of the searched jobs and a job completion time of a job being processed which is acquired from another job processing apparatus, a job processing apparatus to process the searched jobs; and
displaying the specified other job processing apparatus.

9. A non-transitory computer readable storage medium for storing a computer program for controlling a job processing apparatus, the computer program comprising:
a code to hold jobs in a holding unit;
a code to image a plurality of users;
a code to detect face information of the plurality of imaged users;
a code to recognize the plurality of users based on the detected face information;
a code to search the holding unit for jobs of the plurality of recognized users;
a code to determine, based on processing time of the searched jobs, an order of executing the searched jobs; and
a code to display information indicating the users corresponding to the ordered jobs based on the determined order of executing the jobs.

* * * * *